(12) United States Patent
Shi et al.

(10) Patent No.: US 12,141,674 B2
(45) Date of Patent: Nov. 12, 2024

(54) METHOD FOR GENERATING USER INTERACTIVE INFORMATION PROCESSING MODEL AND METHOD FOR PROCESSING USER INTERACTIVE INFORMATION

(71) Applicant: Beijing Baidu Netcom Science And Technology Co Ltd, Beijing (CN)

(72) Inventors: Yixuan Shi, Beijing (CN); Mingyang Dai, Beijing (CN); Zixiang Liu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 662 days.

(21) Appl. No.: 17/210,034

(22) Filed: Mar. 23, 2021

(65) Prior Publication Data
US 2021/0209446 A1 Jul. 8, 2021

(30) Foreign Application Priority Data
Sep. 30, 2020 (CN) .......................... 202011062251.4

(51) Int. Cl.
*G06N 3/04* (2023.01)
*G06N 3/08* (2023.01)
*H04L 67/50* (2022.01)

(52) U.S. Cl.
CPC .................. *G06N 3/04* (2013.01); *G06N 3/08* (2013.01); *H04L 67/535* (2022.05)

(58) Field of Classification Search
CPC ............ G06N 3/04; G06N 3/08; G06N 3/045; G06N 3/105; G06N 3/082; G06N 3/048;
(Continued)

(56) References Cited

U.S. PATENT DOCUMENTS 10,387,754 B1 * 8/2019 Kim ....................... G06V 10/82
10,650,432 B1    5/2020 Joseph et al.
(Continued)

FOREIGN PATENT DOCUMENTS

CN    111382843 A    7/2020
CN    111445020 A    7/2020
(Continued)

OTHER PUBLICATIONS

Decision to Grant issued May 10, 2022 in connection with corresponding Japanese Patent Application No. 2021-072004.
(Continued)

*Primary Examiner* — Vincent M Cao
(74) *Attorney, Agent, or Firm* — Akerman LLP

(57) ABSTRACT

The present application discloses a method for generating a user interactive information processing model and a method for processing user interactive information, relates to the technical field of graph neural networks, and particularly relates to a user interactive information processing technology. The method comprises the following steps: determining node representations of network nodes of each layer in a graph neural network in an iterative manner, wherein the node representation of a single-layer node is obtained by representations of neighbor nodes of the single-layer node; adding the attribute feature of each node in each layer of network nodes to the node representation of each layer of network nodes to obtain a graph neural network to be trained; and training the graph neural network to be trained based on existing user interactive information, to obtain a user interactive information processing model, wherein the user interactive information processing model comprises adjusted node representation.

17 Claims, 4 Drawing Sheets

(58) Field of Classification Search
CPC ....... G06N 5/02; H04L 67/535; H04L 67/306; G06F 16/367; G06F 18/22
See application file for complete search history.

(56) References Cited

U.S. PATENT DOCUMENTS

| | | | | |
|---|---|---|---|---|
| 2018/0150740 | A1* | 5/2018 | Wang | G06N 3/08 |
| 2018/0247224 | A1* | 8/2018 | Garcia Duran | G06N 20/00 |
| 2019/0236464 | A1 | 8/2019 | Feinson et al. | |
| 2020/0065374 | A1* | 2/2020 | Gao | G06N 3/08 |
| 2021/0051121 | A1* | 2/2021 | Menon | G06Q 10/107 |
| 2021/0287067 | A1* | 9/2021 | Zavoronkovs | G06N 3/044 |
| 2021/0326674 | A1* | 10/2021 | Liu | G06Q 30/0282 |

FOREIGN PATENT DOCUMENTS

| | | |
|---|---|---|
| CN | 111651671 A | 9/2020 |
| CN | 111695719 A | 9/2020 |
| CN | 111708876 A | 9/2020 |
| JP | 2018063484 A | 4/2018 |
| JP | 2020017295 A | 1/2020 |
| JP | 2020035148 A | 3/2020 |
| JP | 2020521207 A | 7/2020 |

OTHER PUBLICATIONS

"Measuring user engagement on Twitter based on conversations and visualizing the change over time," DEIM Forum 2015 F8-4.
Sasagawa et al., "Recommendation System based on Generative Adversarial Network with Graph Convolutional Layers," The 33rd Annual Conference of the Japanese Society for Artificial Intelligence, 2019, pp. 1-4.
"Semi-supervised Learning on Network Using Structure Features and Graph Convolution," The 33rd Annual Conference of the Japanese Society for Artificial Intelligence, 2019.
Extended European Search Report issued in connection with corresponding European Patent Application No. 21164621.1, dated Sep. 21, 2021.
Request for the Submission of an Opinion issued Aug. 29, 2022 in connection with Korean Patent Application No. 10-2021-0038053.
Deligiannis et al., "Deep Learning for Geolocating Social Media Users and Detecting Fake News," STO-MP-IST-160, 2018, pp. 1-12.
Haochen et al., "Recommendation Method Based on Multidimensional Social Relationship Embedded Deep Graph Neural Network," Journal of Computer Applications, Oct. 10, 2020, vol. 40, pp. 2795-2803.

* cited by examiner

METHOD FOR GENERATING USER INTERACTIVE INFORMATION PROCESSING MODEL AND METHOD FOR PROCESSING USER INTERACTIVE INFORMATION

CROSS-REFERENCE TO RELATED APPLICATION

This application claims priority to Chinese patent application No. 202011062251.4, filed on Sep. 30, 2020, which is hereby incorporated by reference in its entirety.

TECHNICAL FIELD

The present application relates to the technical field of knowledge graphs, in particular to a graph neural network technology, more in particular to a method for generating a user interactive information processing model, a method for processing user interactive information, an apparatus, a device and a storage medium.

BACKGROUND

In general, a user interactive network belongs to a way of aggregating behaviors of Internet users, and is used for engineers to analyze and process a user model in a next step by aggregating user interactive behaviors (such as comments, like, follow and the like) on a network into network structure data, so as to mine valuable data information. With regard to user representation technologies, user attributes are mostly represented in the form of tags at present, for example, attribute tags such as age, gender, education and the like are added to a user, and then a relationship between the tags of the user and confidence scores and the like may be established through an appropriate model. A tag representation technique has the advantages of being easy to understand, strong in universality and capable of supporting a plurality of service points.

SUMMARY

The present application provides a method for generating a user interactive information processing model, a method for processing user interactive information, an apparatus, a device and a storage medium.

According to a first aspect of the present application, there is provided a method for generating a user interactive information processing model, which may include:
  determining node representations of network nodes of each layer in a graph neural network in an iterative manner, wherein the node representation of a single-layer node is obtained by representations of neighbor nodes of the single-layer node;
  adding attribute feature of each of the network nodes of each layer into the node representations of the network nodes of each layer, to obtain a graph neural network to be trained; and
  training the graph neural network to be trained based on existing user interactive information, to obtain a user interactive information processing model, wherein the user interactive information processing model comprises an adjusted node representation, and wherein the user interactive information comprises interaction behavior data between users and attribute feature data of the users themselves.

According to a second aspect of the present application, there is provided a method for processing user interactive information, the method is based on a user interactive information processing model generated by the aforementioned method, the method for processing user interactive information may include:
  inputting interactive information of a seed user and interactive information of a user to be processed into the user interactive information processing model, and obtaining representation of the user to be processed through predicting, based on representation of the seed user;
  determining a similarity between users to be processed, based on the representations of the users to be processed, and in a case where the similarity is greater than or equal to a preset threshold value, the corresponding users are similar users; and
  acquiring information of the similar users.

According to a third aspect of the present application, there is provided an electronic device, which may include:
  at least one processor; and
  a memory communicatively connected to the at least one processor; wherein,
  the memory stores instructions executable by the at least one processor, the instructions being executed by the at least one processor to enable the at least one processor to execute the aforementioned method for generating a user interactive information processing model or the aforementioned method for processing user interactive information.

According to a fourth aspect of the present application, there is provided a non-transitory computer-readable storage medium storing computer instructions, wherein the computer instructions cause a computer to perform the aforementioned method for generating a user interactive information processing model or the aforementioned method for processing user interactive information.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The drawings are provided for better understanding of the present application, rather than limiting the present application. In which.

DETAILED DESCRIPTION

Exemplary embodiments of the present application are described below in combination with the accompanying drawings, including various details of the embodiments of the present application to facilitate the understanding, and they should be considered as merely exemplary. Thus, it should be realized by those of ordinary skill in the art that various changes and modifications can be made to the embodiments described here without departing from the scope and spirit of the present application. Also, for the sake of clarity and conciseness, the contents of well-known functions and structures are omitted in the following description.

To facilitate the description of the ideas of the embodiments of the present application, concepts to which the embodiments of the present application may be directed are briefly described below.

In general, a user interactive network belongs to a way of aggregating behaviors of Internet users, and is used for engineers to analyze and process a user model in a next step by aggregating user interactive behaviors (such as comments, like, follow and the like) on a network into network structure data, so as to mine valuable data information. With regard to user representation technologies, user attributes are mostly represented in the form of tags at present, for example, attribute tags such as age, gender, education and the like are added to a user, and then a relationship between the tags of the user and confidence scores and the like may be established through an appropriate model. A tag representation technique has the advantages of being easy to understand, strong in universality and capable of supporting a plurality of service points. However, in practical application, due to the limitation of single attribute data provided by the tag representation method, deficiencies in data for representing user interactions, and a lack of representation of other types of information associated with a user, the reliability of results of subsequent data analysis and processing is poor.

Figure 1:
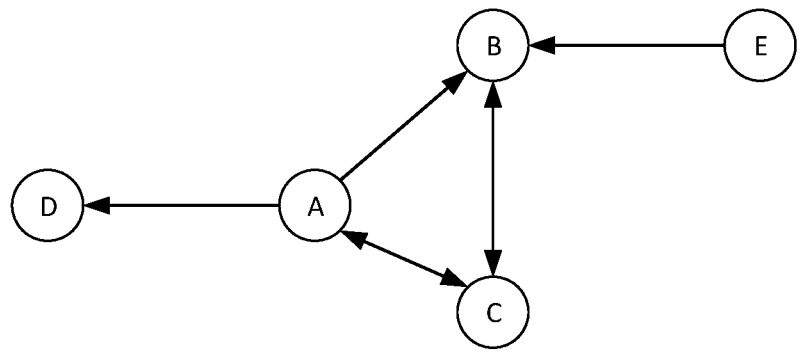
FIG. 1 schematically shows a simple graph structure.
Figure 2:
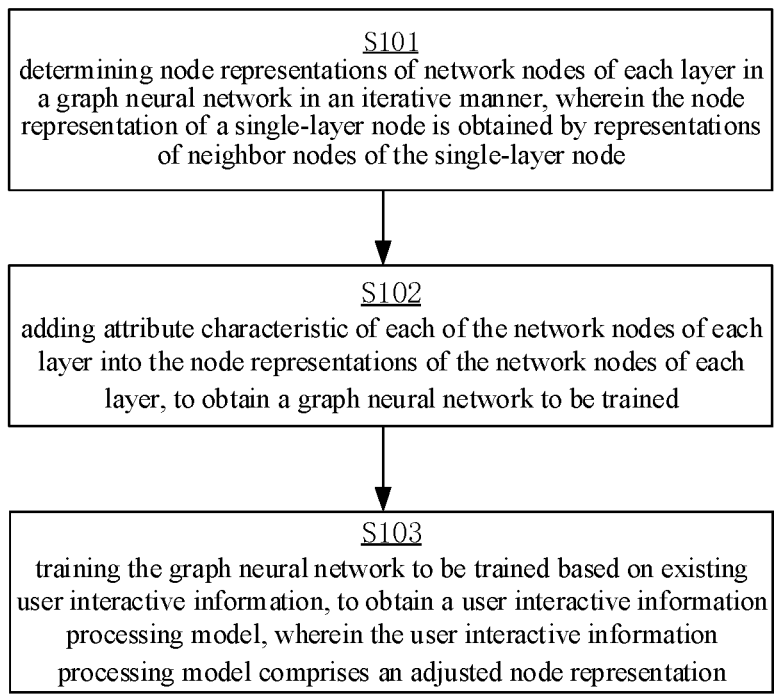
FIG. 2 is a flowchart of a method for generating a user interactive information processing model according to an embodiment of the present application.

FIG. 1 schematically shows a simple graph structure including a plurality of nodes and edges, which may or may not be directional depending on whether there is a directional dependency between the nodes.

Graph embedding, also known as embedding of a graph, is a method for representing network structure data. According to the method, network nodes are mainly represented as low-dimensional, dense vectors, to assist in understanding the nature of network structure data, which may be applied to process graph tasks such as similar node identification, link prediction and the like.

User representation learning is a sub-direction to user portrait, which belongs to user-side representation learning. The main purpose of representation learning is to represent an object with high complexity as one with low complexity or capable of being processed by a downstream model, by extracting features and other methods. The user representation learning is an important output method of user portrait, which is generally used to recommend image and text, video, advertisement and other services.

Therefore, an embodiment of the present application provides a method for generating a user interactive information processing model. With reference to FIG. 1, the method may include:

S101, determining node representations of network nodes of each layer in a graph neural network in an iterative manner, wherein the node representation of a single-layer node is obtained by representations of neighbor nodes of the single-layer node;

S102, adding attribute feature of each of the network nodes of each layer into the node representations of the network nodes of each layer, to obtain a graph neural network to be trained; and S103, training the graph neural network to be trained based on existing user interactive information, to obtain a user interactive information processing model, wherein the user interactive information processing model comprises an adjusted node representation, and wherein the user interactive information comprises interaction behavior data between users and attribute feature data of the users themselves.

The embodiment of the present application provides an idea of analyzing a user interactive network by utilizing a graph neural network (GNN). The GNN constructed through a specific operation, based on object information with node attributes and interactive information with side attributes in the user interactive network, not only covers attribute features (such as user age, gender, education and the like) of the nodes themselves, but also may cover interactive relationship features (e.g., comments, like, follow, etc.) between the nodes. The trained graph prediction model can comprehensively reflect the association between users and achieve the purpose of recalling users with high similarity, and recall results may be used in downstream related services, such as recommended systems and the like.

In some embodiments of the present application, it is contemplated that a network node may be represented by a peripheral node, e.g., a network node of an $i^{th}$ layer in a graph neural network may be represented by its neighbor nodes, e.g., the node may be represented according to its association relationship (or dependency) with one or more nodes of its periphery. Further, nodes of each layer may be determined in the way of iteration, particularly layer-by-layer iteration, e.g., nodes of an $(i+1)^{th}$ layer may be represented by nodes of the $i^{th}$ layer, and therefore the representations of nodes of each layer may be iteratively determined.

In some embodiments of the present application, alternatively, a single node in the graph neural network may include a user and/or material in a user interactive network, and the material may include at least one of text, image, audio and video. Users, texts, images, audios, videos and other objects with node attributes in the user interactive network can be comprehensively analyzed and processed, to accurately reflect the global interaction characteristic of the user interactive network.

In some embodiments of the present application, alternatively, the adding the attribute feature of each of the network nodes of each layer into the node representations of the network nodes of each layer, may include: adding the attribute feature of each of the network nodes of each layer into the node representations of the network nodes of each layer, through a concat operation for merging array.

Through the concat operation, a GNN may cover not only the attribute features (such as user age, gender, education and the like) of the nodes themselves, but also the interactive relationship features (such as comments, like, follow, etc.) between the nodes. The trained graph prediction model can comprehensively reflect the relationship between users.

In some embodiments of the present application, alternatively the training the graph neural network to be trained may include training the graph neural network to be trained by means of link prediction.

In some embodiments of the present application, alternatively, the graph neural network may adopt at least one of a graph convolution network (GCN), a graph attention network (GAT) and a graph isomorphism network (GIN); alternatively, a loss function used in a training process may include a cross-entropy loss function, so that a good convergence effect can be obtained.

Figure 3:
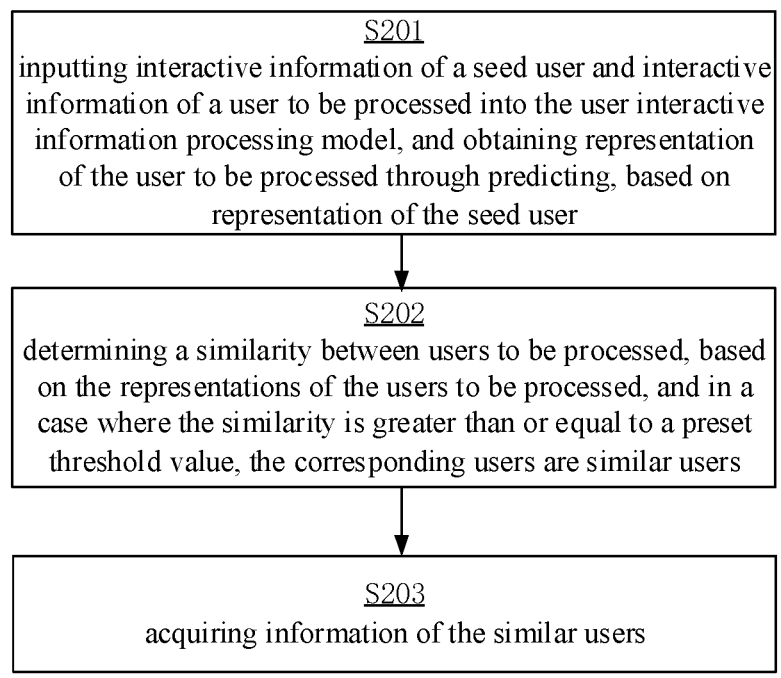
FIG. 3 is a flowchart of a method for processing user interactive information according to an embodiment of the present application.

Correspondingly, an embodiment of the present application also provides a method for processing user interactive information. As shown in FIG. 3, the method for processing user interactive information is based on a user interactive information processing model generated by the aforementioned method for generating a user interactive information processing model, and the method for processing user interactive information may include:

S201, inputting interactive information of a seed user and interactive information of a user to be processed into the user interactive information processing model, and obtaining representation of the user to be processed through predicting, based on representation of the seed user;

S202, determining a similarity between users to be processed, based on the representations of the users to be processed, and in a case where the similarity is greater than or equal to a preset threshold value, the corresponding users are similar users; and S203, acquiring information of the similar users.

According to the embodiment of the present application, a user interactive network is established, a user is used as a network node, a graph vector representation technology is adopted, to obtain a user vector which is used in a downstream support service, applied to a recommended service by landing, so that a good recall effect can be achieved.

Various embodiments of the present application have been described above, and alternative implementations and processes of the embodiments of the present application are described in detail below by way of specific examples.

Firstly, in one embodiment of the present application, it is considered that a network node is represented by a peripheral node, node representation of each layer is iteratively determined by the following equation:

$$h_{i+1} = f(h_i, \{h_j\}_{j \in N})$$

wherein, $h_j$ represents the representations of network nodes of an $i^{th}$ layer, N represents a neighbor node subgraph of a current node, f( ) is a neighbor-user calculation function, the form of f( ) may be different based on the type of a selected network layer (such as a graph convolution network GCN, a graph attention network GAT, a graph isomorphism network GIN), and the like. In addition, f( ) may be realized by concat for merging array, and may also be realized by means of pooling functions such as mean, max, etc. In other words, user nodes of each layer are represented by their surrounding neighbor nodes, thus the information of the network structure and the characteristics of the surrounding neighbor nodes can be embodied.

Secondly, introducing attribute features of the network node itself, including but not limited to natural attributes such as user age, gender and the like, social attributes such as marriage, education and the like, as well as network behaviors such as interest points, click history and the like, the attribute representations of the network node itself may be added or spliced into node features of each layer through a concat operation:

$$u_i = \mathrm{concat}(h_i, \Sigma \mathrm{feature})$$

wherein, user feature representations and intrinsic hidden layer representations are linked by a concat operation.

Thirdly, model training is performed by means of link prediction (LinkPrediction) as follows:

$$y_{ij,pred} = Wf(\mathrm{Concat}(h_i, h_j))$$

wherein, an unnormalized logits probability of i, j link edges is obtained by establishing a $h_i$ to $h_j$ similar link through a pre-determined similar user, wherein W is a weight matrix for a last layer, $W \in R^{d*c}$, wherein d is output dimension for a previous layer, and c is a class number, in this case binary-class. A loss Loss may be determined by a loss function such as cross-entropy in the downstream during training.

After the whole network is constructed, training and prediction are performed by using graph data with user peripheral nodes and features, to obtain node representations. The node representations obtained by the above method have the features of being dense and low dimension, can be suitable for obtaining similar user services, and can improve an obvious gain on the recall side of the recommended system.

Figure 4:
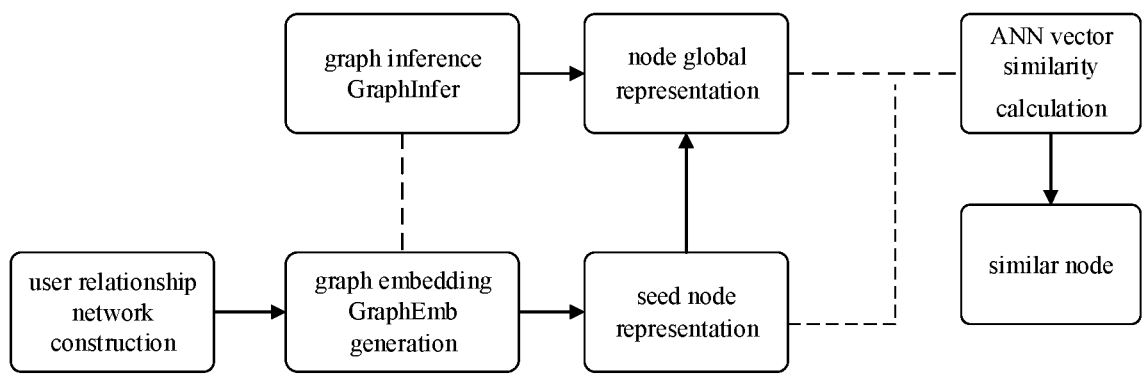
FIG. 4 is a business process diagram of processing user interactive information according to an embodiment of the present application.

Referring to the business process structure diagram shown in FIG. 4, the network node representation is constructed through the above model, and the downstream process may be applied to the service of determining a similar user, and the whole process is divided into three portions: a network constructing module, a node representation module and a similarity determining module.

In this scenario, the graph network is constructed by a user interactive network, such as a user A following a user B on a certain APP, which is regarded as an interactive network edge. Network edges are merged within a period of time into a user interactive network. A heterogeneous network may also be constructed based on service logs, wherein nodes may be composed of materials such as images and texts, videos and the like.

The node representation module mainly utilizes the above model to obtain a low-dimensional dense vector representations, and a prediction module covers each node in the network. A part of high-activity or key users are determined in advance by using the strategy of seed users in the business, and are popularized to all network users through prediction tasks by taking their representations as starting points.

The similarity determining module mainly uses artificial neural network (ANN) related technology to represent the input total users and obtain a user return with higher similarity by calculation. There are a plurality of implementations in which a cos distance or a Manhattan distance may be calculated using vectors of two users, with a larger distance indicating that the two users are more similar.

Similar users are often applied for a recommended system, such as a recall path, UCF, etc., based on similar users with good quality, to make a good recommendation result. The embodiment of the present application may be applied to a user representation recommended system, by which information is not interested or concerned can be filtered out for a user, and personalized information can be provided, for example, two stages of recall and rank may be executed. A partial refined recommended system may also include coarse arrangement, fine arrangement, rearrangement and the like, so as to facilitate refined personalized recommendation. The recall phase is mainly obtained quickly from huge data of the whole Internet, and belongs to the most upstream of the whole recommended system.

Figure 5:
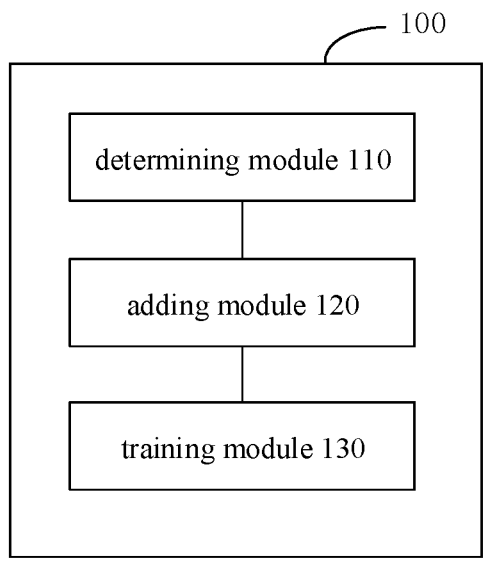
FIG. 5 is a structural block diagram of an apparatus for generating a user interactive information processing model according to an embodiment of the present application.

The particular arrangements and implementations of the embodiments of the present application have been described above from different perspectives by various embodiments. Correspondingly to the processing method of at least one embodiment described above, an embodiment of the present application also provides an apparatus 100 for generating a user interactive information processing model. Referring to FIG. 5, the apparatus 100 for generating a user interactive information processing model may include:

- a determining module 110 configured for determining node representations of network nodes of each layer in a graph neural network in an iterative manner, wherein the node representation of a single-layer node is obtained by representations of neighbor nodes of the single-layer node;
- an adding module 120 configured for adding attribute feature of each of the network nodes of each layer into the node representations of the network nodes of each layer, to obtain a graph neural network to be trained; and
- a training module 130 configured for training the graph neural network to be trained based on existing user interactive information, to obtain a user interactive information processing model, wherein the user interactive information processing model comprises an adjusted node representation, and wherein the user interactive information comprises interaction behavior data between users and attribute feature data of the users themselves.

Figure 6:
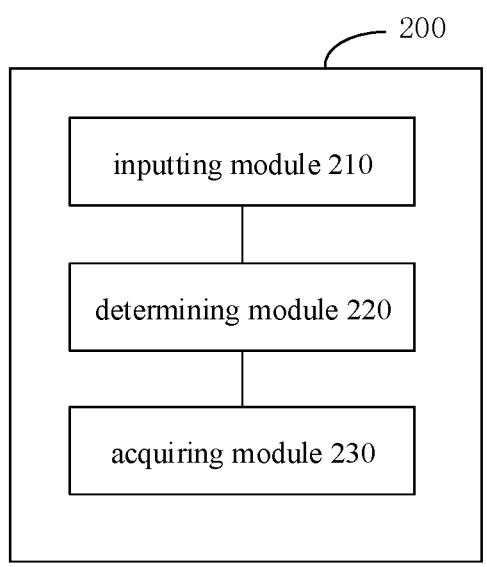
FIG. 6 is a structural block diagram of an apparatus for processing user interactive information according to an embodiment of the present application.

Correspondingly to the processing method of at least one embodiment described above, an embodiment of the present application also provides a code generating apparatus 200. Referring to FIG. 6, the code generating apparatus 200 may include:

- an inputting module 210 configured for inputting interactive information of a seed user and interactive information of a user to be processed into the user interactive information processing model, and obtaining representation of the user to be processed through predicting, based on representation of the seed user;
- a determining module 220 configured for determining a similarity between users to be processed, based on the representations of the users to be processed, and in a case where the similarity is greater than or equal to a preset threshold value, the corresponding users are similar users; and
- an acquiring module 230 configured for acquiring information of the similar users.

The functions of respective modules in each apparatus of the embodiments of the present application may be seen in the processes correspondingly described in the embodiments of the method described above, and will not be described repeatedly herein.

Figure 7:
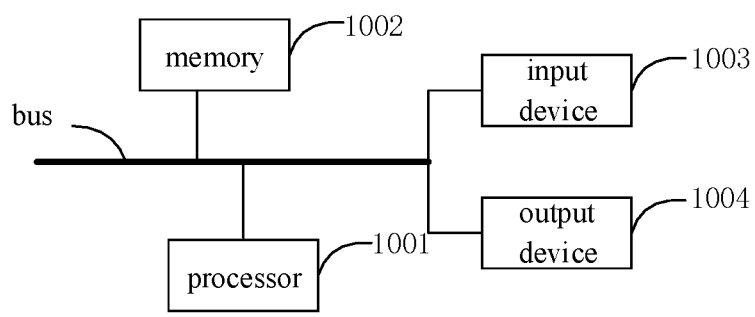
FIG. 7 is a block diagram of an electronic device for implementing a method for generating a user interactive information processing model or a method for processing user interactive information according to an embodiment of the present application.

According to an embodiment of the present application, the present application further provides an electronic device and a readable storage medium. FIG. 7 is a block diagram of an electronic device for implementing a code generating method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 7, the electronic device may include one or more processors 1001, a memory 1002, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 1001 is shown in FIG. 7.

The memory 1002 is a non-transitory computer-readable storage medium provided by the present application. The memory stores instructions executable by at least one processor to cause the at least one processor to execute the code generating method provided by the present application. The non-transitory computer-readable storage medium of the present application stores computer instructions for enabling a computer to execute the code generating method provided by the present application.

The memory 1002, as a non-transitory computer-readable storage medium, may be configured to store non-transitory software programs, non-transitory computer executable programs and modules, such as program instructions/modules corresponding to the code generating method in the embodiments of the present application (e.g., the code processing module 110, the first conversion module 120, and the second conversion module 130 shown in FIG. 3). The processor 1001 executes various functional applications and data processing of the server by running the non-transitory software programs, instructions and modules stored in the memory 1002, that is, implements the code generating method in the above method embodiments.

The memory 1002 may include a program storage area and a data storage area, wherein the program storage area may store an operating system, and an application program required for at least one function; and the data storage area may store data created according to the use of the electronic device of analyzing and processing a searched result, etc. In addition, the memory 1002 may include a high speed random access memory, and may also include a non-transitory memory, such as at least one disk storage device, a flash memory device, or other non-transitory solid state storage devices. In some embodiments, the memory 1002 may alternatively include memories remotely located with respect to the processor 1001, and these remote memories may be connected, via a network, to the electronic devices of analyzing and processing a searched result. Examples of such networks may include, but are not limited to, the Internet, an intranet, a local area network, a mobile communication network and combinations thereof.

The electronic device corresponding to the code generating method in the embodiment of the present application may further include an input device 1003 and an output device 1004. The processor 1001, the memory 1002, the input device 1003, and the output device 1004 may be connected by a bus or in other ways, and the bus connection is taken as an example in FIG. 7.

The input device 1003 may receive input digitals or character information, and generate a key signal input related to a user setting and a function control of the electronic device of analyzing and processing a searched result. For example, the input device may be a touch screen, a keypad, a mouse, a track pad, a touch pad, a pointer stick, one or more mouse buttons, a track ball, a joystick, and other input devices. The output device 1004 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A method for generating a user interactive information processing model, comprising:
   determining node representations of network nodes of each layer in a graph neural network in an iterative manner, wherein the node representation of a single-layer node is obtained by representations of neighbor nodes of the single-layer node;
   adding attribute feature of each of the network nodes of each layer into the node representations of the network nodes of each layer, to obtain a graph neural network to be trained; and
   training the graph neural network to be trained based on existing user interactive information, to obtain a user interactive information processing model, wherein the user interactive information processing model comprises an adjusted node representation, and
   wherein the user interactive information comprises interaction behavior data between users and attribute feature data of the users themselves,
   wherein, the adding the attribute feature of each of the network nodes of each layer into the node representations of the network nodes of each layer, comprises: adding the attribute feature of each of the network nodes of each layer into the node representations of the network nodes of each layer, through a concat operation for merging array:

$u_i = \text{concat}(h_i, \Sigma \text{feature})$ wherein $h_i$ represents the representations of network nodes of an $i^{th}$ layer, and feature represents attribute features of the network nodes.

2. The method of claim 1, wherein,
   the training the graph neural network to be trained comprises: training the graph neural network to be trained by means of link prediction.

3. The method of claim 1, wherein,
the graph neural network adopts at least one of a graph convolution network (GCN), a graph attention network (GAT) and a graph isomorphism network (GIN); and/or,
a loss function used in a training process comprises a cross-entropy loss function.

4. The method of claim 1, wherein,
a single node in the graph neural network comprises a user and/or material in a user interactive network, wherein the material comprises at least one of text, image, audio and video.

5. A method for processing user interactive information, the method for processing user interactive information is based on a user interactive information processing model generated by the method of claim 1, and comprises:
inputting interactive information of a seed user and interactive information of a user to be processed into the user interactive information processing model, and obtaining representation of the user to be processed through predicting, based on representation of the seed user;
determining a similarity between users to be processed, based on the representations of the users to be processed, and in a case where the similarity is greater than or equal to a preset threshold value, the corresponding users are similar users; and
acquiring information of the similar users.

6. The method of claim 5, wherein,
the determining the similarity between the users to be processed, based on the representations of the users to be processed, comprises:
calculating a distance between the users to be processed through vectors of the users to be processed, and representing the similarity between the users to be processed through the distance between the users to be processed.

7. An apparatus for generating a user interactive information processing model, comprising:
a processor and a memory for storing one or more computer programs executable by the processor,
wherein when executing at least one of the computer programs, the processor is configured to perform operations comprising:
determining node representations of network nodes of each layer in a graph neural network in an iterative manner, wherein the node representation of a single-layer node is obtained by representations of neighbor nodes of the single-layer node;
adding attribute feature of each of the network nodes of each layer into the node representations of the network nodes of each layer, to obtain a graph neural network to be trained; and
training the graph neural network to be trained based on existing user interactive information, to obtain a user interactive information processing model, wherein the user interactive information processing model comprises an adjusted node representation, and wherein the user interactive information comprises interaction behavior data between users and attribute feature data of the users themselves,
wherein, the adding the attribute feature of each of the network nodes of each layer into the node representations of the network nodes of each layer, comprises:
adding the attribute feature of each of the network nodes of each layer into the node representations of the network nodes of each layer, through a concat operation for merging array:

$$u_i = \text{concat}(h_i, \Sigma \text{feature})$$

wherein $h_i$ represents the representations of network nodes of an $i^{th}$ layer, and feature represents attribute features of the network nodes.

8. The apparatus of claim 7, wherein, when executing at least one of the computer programs, the processor is configured to further perform operations comprising:
training the graph neural network to be trained by means of link prediction.

9. The apparatus of claim 7, wherein, the graph neural network adopts at least one of a graph convolution network (GCN), a graph attention network (GAT) and a graph isomorphism network (GIN); and/or,
a loss function used by the processor comprises a cross-entropy loss function.

10. The apparatus of claim 7, wherein,
a single node in the graph neural network comprises a user and/or material in a user interactive network, wherein the material comprises at least one of text, image, audio and video.

11. An apparatus for processing user interactive information, the apparatus for processing user interactive information is based on a user interactive information processing model generated by the apparatus of claim 8, and comprises:
a processor and a memory for storing one or more computer programs executable by the processor,
wherein when executing at least one of the computer programs, the processor is configured to perform operations comprising:
inputting interactive information of a seed user and interactive information of a user to be processed into the user interactive information processing model, and obtaining representation of the user to be processed through predicting, based on representation of the seed user;
determining a similarity between users to be processed, based on the representations of the users to be processed, and in a case where the similarity is greater than or equal to a preset threshold value, the corresponding users are similar users; and
acquiring information of the similar users.

12. The apparatus of claim 11, wherein, when executing at least one of the computer programs, the processor is configured to further perform operations comprising:
calculating a distance between the users to be processed through vectors of the users to be processed, and representing the similarity between the users to be processed through the distance between the users to be processed.

13. A non-transitory computer-readable storage medium storing computer instructions, wherein the computer instructions cause a computer to perform operations of:
determining node representations of network nodes of each layer in a graph neural network in an iterative manner, wherein the node representation of a single-layer node is obtained by representations of neighbor nodes of the single-layer node;

adding attribute feature of each of the network nodes of each layer into the node representations of the network nodes of each layer, to obtain a graph neural network to be trained; and training the graph neural network to be trained based on existing user interactive information, to obtain a user interactive information processing model, wherein the user interactive information processing model comprises an adjusted node representation, and wherein the user interactive information comprises interaction behavior data between users and attribute feature data of the users themselves, wherein, the adding the attribute feature of each of the network nodes of each layer into the node representations of the network nodes of each layer, comprises: adding the attribute feature of each of the network nodes of each layer into the node representations of the network nodes of each layer, through a concat operation for merging array:

$$u_i = \text{concat}(h_i, \Sigma \text{feature})$$

wherein $h_i$ represents the representations of network nodes of an $i^{th}$ layer, and feature represents attribute features of the network nodes.

14. The non-transitory computer-readable storage medium of claim 13, wherein the training the graph neural network to be trained comprises: training the graph neural network to be trained by means of link prediction.

15. The non-transitory computer-readable storage medium of claim 13, wherein
the graph neural network adopts at least one of a graph convolution network (GCN), a graph attention network (GAT) and a graph isomorphism network (GIN); and/or,
a loss function used in a training process comprises a cross-entropy loss function.

16. The non-transitory computer-readable storage medium of claim 13, wherein a single node in the graph neural network comprises a user and/or material in a user interactive network, wherein the material comprises at least one of text, image, audio and video.

17. The non-transitory computer-readable storage medium of claim 13, wherein the computer instructions cause the computer to perform operations of:
inputting interactive information of a seed user and interactive information of a user to be processed into the user interactive information processing model, and obtaining representation of the user to be processed through predicting, based on representation of the seed user;
determining a similarity between users to be processed, based on the representations of the users to be processed, and in a case where the similarity is greater than or equal to a preset threshold value, the corresponding users are similar users; and
acquiring information of the similar users.

* * * * *